(12) United States Patent
Park et al.

(10) Patent No.: US 8,899,890 B2
(45) Date of Patent: Dec. 2, 2014

(54) THREE-DIMENSIONAL RECONFIGURABLE MACHINING SYSTEM

(75) Inventors: Jong-Kweon Park, Daejeon (KR);
Seung-Kook Ro, Daejeon (KR);
Byung-Sub Kim, Daejeon (KR);
Gyung-Ho Khim, Chungcheongbuk-do (KR); Sung-Cheul Lee, Masan-si (KR);
Hyeon-Hwa Lee, Daejeon (KR);
Byung-In Kim, Daejeon (KR)

(73) Assignee: Korea Institute of Machinery & Materials, Daejeon (KR)

( * ) Notice: Subject to any disclaimer, the term of this patent is extended or adjusted under 35 U.S.C. 154(b) by 812 days.

(21) Appl. No.: 13/106,141

(22) Filed: May 12, 2011

(65) Prior Publication Data

US 2011/0280680 A1 Nov. 17, 2011

(30) Foreign Application Priority Data

May 14, 2010 (KR) .......................... 10-2010-0045590

(51) Int. Cl.
*B23C 1/12* (2006.01)
*B23Q 1/54* (2006.01)
*B23Q 1/44* (2006.01)

(52) U.S. Cl.
CPC ................ *B23Q 1/5425* (2013.01); *B23Q 1/44* (2013.01); *B23Q 2210/006* (2013.01)
USPC ........... 409/201; 409/141; 409/137; 409/202; 408/236

(58) Field of Classification Search
CPC ........ B23C 1/002; B23C 1/005; B23C 1/007; B23C 1/12; B23C 3/16; B23Q 2210/006
USPC ......... 409/141, 235, 137, 202, 201, 211, 216, 409/236; 408/236

See application file for complete search history.

(56) References Cited

U.S. PATENT DOCUMENTS

| | | | | |
|---|---|---|---|---|
| 2,042,720 A | * | 6/1936 | Lindner | 408/88 |
| 2,445,039 A | * | 7/1948 | Rusnok | 248/278.1 |
| 2,948,168 A | * | 8/1960 | McCormick | 408/69 |
| 4,187,601 A | * | 2/1980 | Aldrin | 29/560 |

(Continued)

FOREIGN PATENT DOCUMENTS

| | | |
|---|---|---|
| EP | 0757934 | 2/1997 |
| EP | 2181800 | 5/2010 |

(Continued)

OTHER PUBLICATIONS

Extended European Search Report, issued Aug. 17, 2011, for European Application No. 11165928.0.

(Continued)

*Primary Examiner* — Daniel Howell
*Assistant Examiner* — Nicole N Ramos
(74) *Attorney, Agent, or Firm* — Pearl Cohen Zedek Latzer Baratz LLP

(57) ABSTRACT

Disclosed is a 3D reconfigurable machining system including a support frame spaced apart from the ground, a circular pivoting frame pivotably installed at the support frame, a slide member slidably installed on the circumferential portion of the pivoting frame, and a main spindle installed vertically at the slide member and being rotatable along the pivoting frame, so that a workpiece can be three-dimensionally machined with a considerably simple structure.

24 Claims, 8 Drawing Sheets

(56) References Cited

U.S. PATENT DOCUMENTS

| | | | |
|---|---|---|---|
| 5,584,621 A * | 12/1996 | Bertsche et al. | 409/201 |
| 5,661,892 A * | 9/1997 | Catania et al. | 29/525.02 |
| 5,943,750 A | 8/1999 | Koren et al. | |
| 6,375,542 B1 * | 4/2002 | Kashchenevsky | 451/24 |
| 6,503,033 B1 * | 1/2003 | Kim et al. | 409/201 |
| 7,104,169 B2 * | 9/2006 | Inada et al. | 82/149 |
| 7,241,090 B2 * | 7/2007 | Reynders | 409/135 |
| 7,293,337 B2 * | 11/2007 | Hosoe | 29/28 |
| 7,857,558 B2 * | 12/2010 | Schrott | 409/216 |
| 8,125,423 B2 * | 2/2012 | Fuchikami et al. | 345/85 |
| 2006/0008335 A1 * | 1/2006 | Furuhashi et al. | 409/202 |
| 2010/0260569 A1 | 10/2010 | Ham | |

FOREIGN PATENT DOCUMENTS

| | | |
|---|---|---|
| JP | 06-039663 | 2/1994 |
| JP | 07-024677 | 1/1995 |
| JP | 07-256575 | 10/1995 |
| JP | 08-267257 | 10/1996 |
| JP | 2010-105146 | 5/2010 |
| KR | 10-0355174 | 9/2002 |
| KR | 100957524 | 5/2010 |
| WO | WO 2009/069155 | 6/2009 |
| WO | WO 2009-100863 | 8/2009 |

OTHER PUBLICATIONS

Japanese Office Action for Japanese Application No. 2011-108438 issued Jan. 4, 2013.

Notice of Allowance for Japanese Patent Application No. 2011-108438, issued on Apr. 3, 2014.

* cited by examiner

THREE-DIMENSIONAL RECONFIGURABLE MACHINING SYSTEM

CROSS-REFERENCE TO RELATED APPLICATION

This application claims priority to and the benefit of Korean Patent Application No. 10-2010-0045590 filed in the Korean Intellectual Property Office on May 14, 2010, the entire content of which is incorporated herein by reference.

BACKGROUND OF THE INVENTION (a) Field of the Invention

The present invention relates to a three-dimensional reconfigurable machining system. More particularly, the present invention relates to a three-dimensional reconfigurable machining system in which a main spindle for machining a workpiece is slidably installed in a circular pivoting frame to be reconfigurable in upper/lower/left/right/forward/backward directions, thus being capable of three-dimensionally machining a workpiece with a simple structure.

(b) Description of the Related Art

In general, a laser machining machine has been developed in order to three-dimensionally machine a workpiece.

However, such a laser machining machine is used mainly in processing a small-sized workpiece, rather than a large-sized one.

For the three-dimensional machining of the large-sized workpiece, 3-axis, 4-axis, and 5-axis machining machines have been developed.

However, those multi-axis machining machines are huge and complicated in structure due to multiple spindles provided therein, and consequently, they are very high-priced.

To solve the above limitation, U.S. Pat. No. 5,943,750 discloses a reconfigurable machine tool including a vertical support unit inserted in a slot to be placed in position, and a horizontal support unit inserted in a hole to be placed in position.

However, the above method of positioning the tool using the vertical support unit and the horizontal support unit has limitations in machining a complicated three-dimensional (3D) structure, and there are drawbacks of low rigidity and high vulnerability to vibration due to the cantilever shape of the tool.

Furthermore, there is the limitation that a tool is mounted to each of the vertical support unit and the horizontal support unit, and thus multi-axis machining needs to be performed.

To solve the above limitation, the applicant of the present invention has proposed a new concept of 3D reconfigurable machining system through Korean Patent Application No. 10-2008-0108376.

However, since the 3D reconfigurable machining system, as shown in FIG. 1, includes arch-shaped pivoting frames 2 and 3, weight balancers 4 and 5 are required for the smooth rotation of the pivoting frames 2 and 3, the pivoting frames 2 and 3 may undergo changes in shape at the time of assembly, and the machining using the pivoting frames 2 and 3 is somewhat complicated.

Therefore, there is the need for a 3D reconfigurable machining system capable of three-dimensionally machining a workpiece in a convenient manner with a structure enabling the smooth rotation of a pivoting frame, undergoing less change in shape at the time of assembly, achieving convenient machining, and having a spindle reconfigurable in upper/lower/left/right/forward/backward directions.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a 3D reconfigurable machining system having advantages of three-dimensionally machining a workpiece in a convenient manner with a structure enabling the smooth rotation of a pivoting frame, undergoing less change in shape at the time of assembly, and having a main spindle that is reconfigurable in upper/lower/left/right/forward/backward directions.

A three-dimensional (3D) reconfiguration machining system according to an exemplary embodiment of the present invention includes: a support frame; a pivoting frame pivotably coupled to the support frame; a slide member slidably coupled to the pivoting frame; and a main spindle coupled to the slide member, and the pivoting frame may have a circular shape.

The support frame may be formed as a granite bed.
The support frame may be supported by a support.
The support may include three supports, and the supports may be separated from each other by the same interval.
An air cushion may be installed at the support.
The support frame may have a doughnut or square shape.
At least one bracket may be installed at the support frame.
The bracket may include two brackets, and the brackets may face each other with respect to the center of the support frame.
The pivoting frame may be pivoted by being connected to a motor.
At least two holes facing each other with respect to the center of the pivoting frame may be formed in a circumferential portion of the pivoting frame, and a worktable lower base may be coupled to the support frame through the two holes.
Each of the holes may have an arch or banana shape.
The system may further include an intermediate base slidably coupled onto the workable lower base and a worktable placed on the intermediate base. In addition, the worktable may slidably cross the worktable intermediate base.
The main spindle may be moved by a linear motor.
A chip discharge unit may be attached to the support frame, and the chip discharge unit may have a hole in the center thereof.
The slide member may be a linear motor.
The slide member may be an air bearing or an LM guide.
The pivoting frame may have a sectional surface with an I-beam shape.
A plurality of holes may be formed along a circumferential surface of the pivoting frame.

A three-dimensional (3D) reconfigurable machining system according to another exemplary embodiment of the present invention includes: a support frame; a forward/backward pivoting frame pivotably coupled to the support frame; a left/right pivoting frame crossing the forward/backward pivoting frame and pivotably coupled to the support frame; a left/right slide member slidably coupled to the forward/backward pivoting frame; a forward/back slide member slidably coupled to the left/right pivoting frame; and a main spindle installed through the left/right slide member and the forward/backward slide member at a location where the forward/backward pivoting frame and the left/right pivoting frame cross each other, and the forward/backward pivoting frame and the left/right pivoting frame have a circular shape.

The system may further include: a worktable lower base installed at the support frame to penetrate the forward/backward pivoting frame and the left/right pivoting frame; a worktable intermediate base slidably installed on the worktable lower base; and a worktable slidably installed on the worktable intermediate base while crossing the worktable intermediate base.

The forward/backward pivoting frame and the left/right pivoting frame may be pivoted by being connected to a motor.

At least two holes facing each other with respect to the center of the forward/backward pivoting frame may be formed in a circumferential portion of the forward/backward pivoting frame, at least two holes facing each other with respect to the center of the left/right pivoting frame may be formed in a circumferential portion of the left/right pivoting frame, and the worktable lower base may be coupled to the support frame through the at least two holes.

Each of the slide members may be a linear motor.

Each of the slide members may be an air bearing or an LM guide.

Each of the pivoting frames may have a sectional surface with an I-beam shape.

A plurality of holes may be formed along a circumferential portion of the pivoting frames.

The support frame may have a doughnut or square shape.

According to the 3D reconfigurable machining system, a machining machine that is capable of performing 3D machining with a simple structure at an economical price can be implemented.

Furthermore, a single main spindle that machines a workpiece is provided. The main spindle is reconfigurable in upper/lower/left/right/forward/backward directions through a circular pivoting frame to thereby three-dimensionally machine the workpiece.

Also, the pivoting frame can be smoothly rotated, undergoes less change in shape at the time of assembly, and is conveniently processed.

DETAILED DESCRIPTION OF THE EMBODIMENTS

Figure 1:
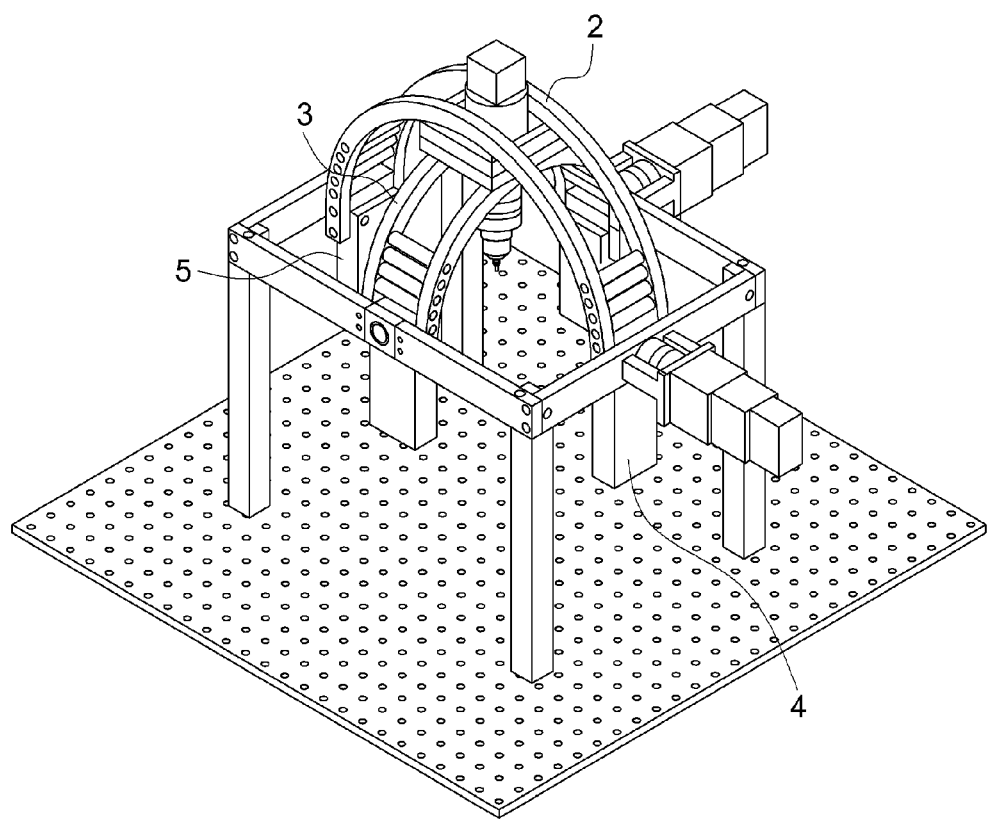
FIG. 1 is a perspective view of a 3D reconfigurable machining system according to the related art.

Advantages and features of the present invention will be clarified through following exemplary embodiments described with reference to the accompanying drawings, so that the scope of the present invention can be easily embodied by those skilled in the art. It will be apparent to those skilled in the art that various modifications and variations can be made in the present invention without departing from the spirit or scope of the invention, and specific exemplary embodiments are exemplified in the drawings and explained in the detailed description. Thus, it is intended that the present invention covers the modifications and variations of this invention provided they come within the scope of the present invention and their equivalents. In the following description, the technical terms are used only for explaining specific exemplary embodiments while not limiting the present invention.

Hereinafter, preferred exemplary embodiments of the present invention will be described in detail with reference to accompanying drawings.

Figure 2:
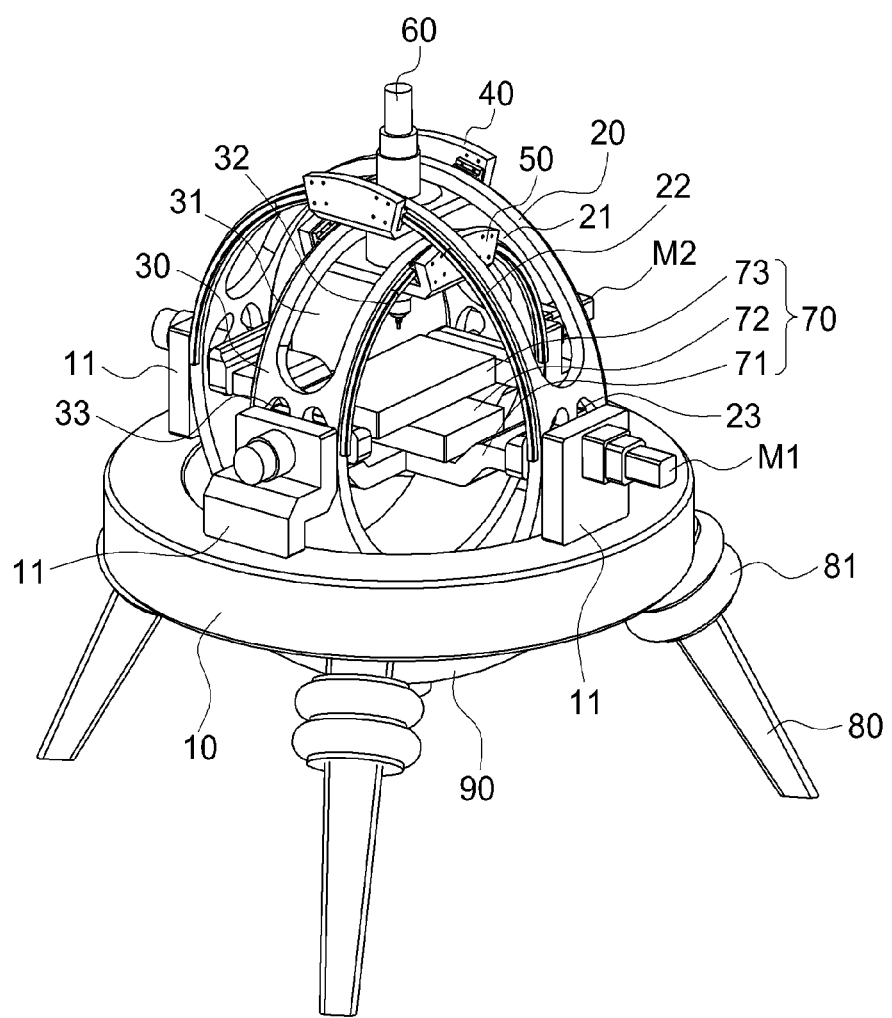
FIG. 2 is a perspective view of a 3D reconfigurable machining system according to an exemplary embodiment of the present invention.
Figure 3:
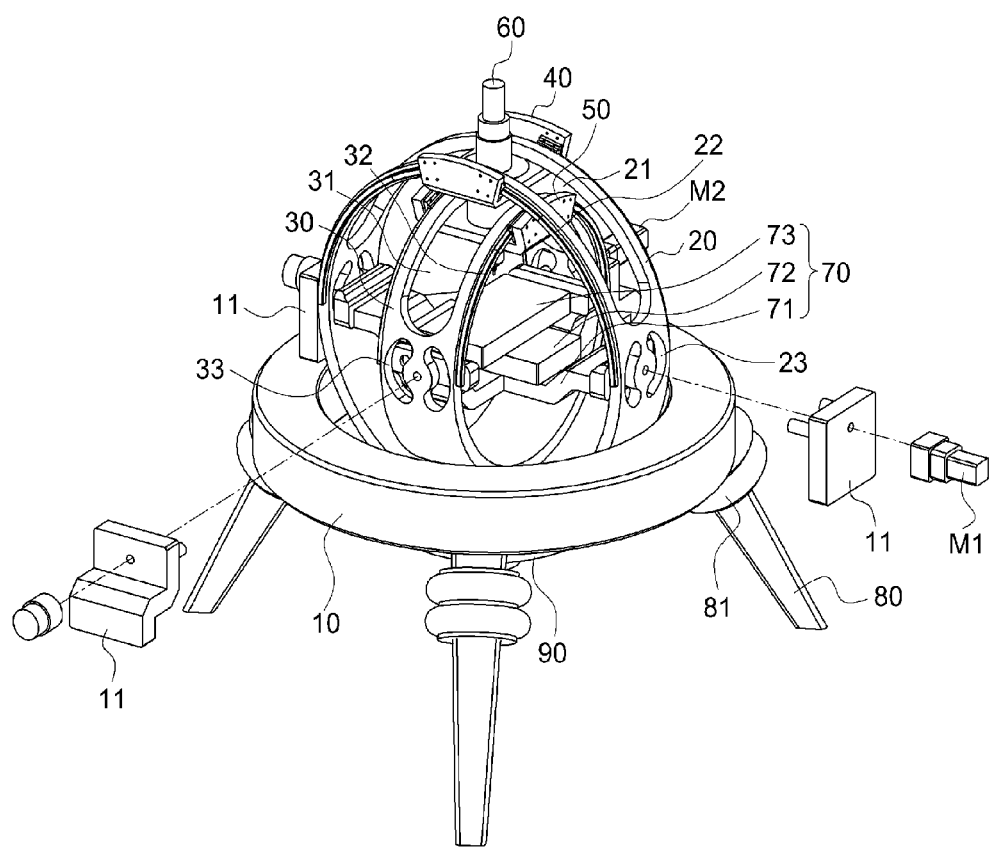
FIG. 3 is an exploded perspective view illustrating the coupling of a support frame and a worktable lower base in the 3D reconfigurable machining system according to an exemplary embodiment of the present invention.
Figure 4:
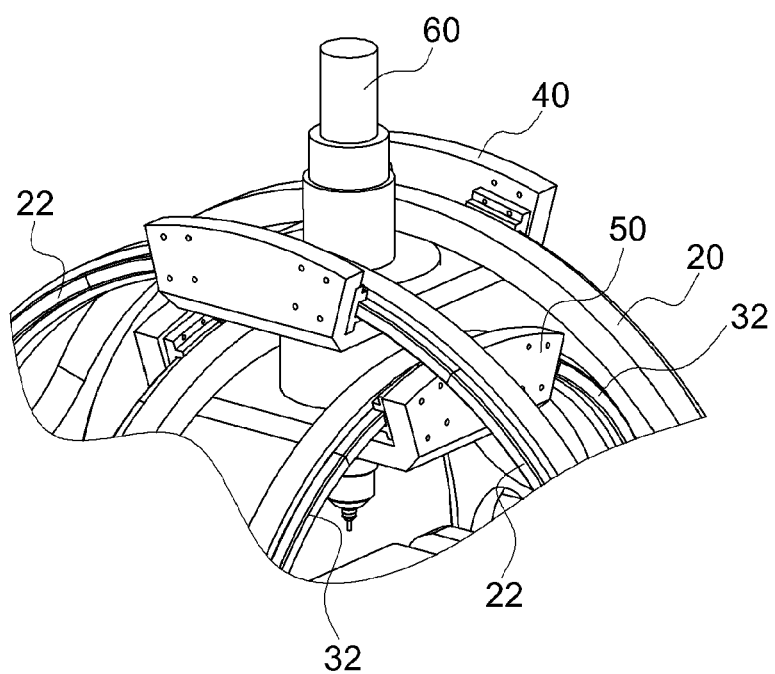
FIG. 4 is an enlarged view illustrating the coupling of a pivoting frame, a slide member, and a main spindle in the 3D reconfigurable machining system according to an exemplary embodiment of the present invention.

FIG. 2 to FIG. 4 are drawings illustrating a 3D reconfigurable machining system according to an exemplary embodiment of the present invention.

Referring to the drawings, a 3D reconfigurable machining system, according to an exemplary embodiment of the present invention, includes a single main spindle 60 for machining a workpiece. The main spindle 60 has a structure that is reconfigurable in upper/lower/left/right/forward/backward directions by a circular forward/backward pivoting frame 20 and a circular left/right pivoting frame 30, thus being capable of three-dimensionally machining a workpiece.

This 3D reconfigurable machining system includes a support frame 10, the forward/backward pivoting frame 20 and the left/right pivoting frame 30 coupled to the support frame 10, a left/right slide member 40 coupled to the circumferential portion of the forward/backward pivoting frame 20, a forward/backward slide member 50 coupled to the circumferential portion of the left/right pivoting frame 40, the main spindle 60 penetrating the left/right slide member 40 and the forward/backward slide member 50, and a worktable unit 70.

Here, the support frame 10 may be formed as, for example, a granite bed in order to reduce the influence of vibration and thermal deformation.

Furthermore, the support frame 10 is spaced away from the ground by three supports 80. The supports 80 are separated from one another at the same interval. An air cushion 81 is installed at each of the supports 80 to block external vibration.

The support frame 10 has a doughnut-shaped structure with an empty center such that the forward/backward pivoting frame 20 and the left/right pivoting frame 30 can be coupled thereto. Furthermore, the shape of the support frame 10 may be square, for example. The number of supports 80 may be arbitrarily selected.

Also, brackets 11 are disposed to face each other with respect to the center of the support frame 10. The forward/backward pivoting frame 20 has a circular shape, and the circumferential portion thereof is connected to the brackets 11.

Similar to the forward/backward pivoting frame 20, the left/right pivoting frame 30 is also connected to separate brackets 11.

The front/backward pivoting frame 20 and the left/right pivoting frame 30 are installed to cross each other. To this end, the left/right pivoting frame 30 is installed at a lower level than the forward/backward pivoting frame 20.

Meanwhile, the forward/backward pivoting frame 20 and the left/right pivoting frame 30 may be pivoted by motors M1 and M2. The forward/backward pivoting frame 20 and the left/right pivoting frame 30 may be pivoted manually without any motor.

Since the forward/backward pivoting frame 20 and the left/right pivoting frame 30 have hollow circular structures, the mass is evenly distributed around the circumferential portion. For this reason, the forward/backward pivoting frame 20 and the left/right pivoting frame 30 can be smoothly pivoted even without a separate weight balancer.

Also, the circular shape of the pivoting frames 20 and 30 ensures less deformation in the inner or outer circumferential direction as compared to the case of an arch shape. Furthermore, since the pivoting frames 20 and 30 have a circular shape, they can be more easily processed.

The left/right slide member 40 is coupled to the circumferential portion of the forward/backward pivoting frame 20. The left/right slide member 40 is movable in a circumferential direction. The main spindle 60 is coupled to the left/right slide member 40 in a penetrating manner.

Furthermore, the forward/backward slide member 50 is coupled to the circumferential portion of the left/right pivoting frame 30. The forward/backward slide member 50 is movable in a circumferential direction. The main spindle 60 is coupled to the center of the forward/backward slide member 50 in a penetrating manner.

The left/right slide member 40 and the forward/backward slide member 50 are installed at a location where the forward/backward pivoting frame 20 and the left/right pivoting frame 30 cross each other.

Accordingly, the main spindle 60 is installed to penetrate the left/right slide member 40 and the forward/backward slide member 50 at the location where the forward/backward pivoting frame 20 and the left/right pivoting frame 30 cross each other.

The forward/backward pivoting frame 20 and the left/right pivoting frame 30 have slits 21 and 31 formed in the circumferential directions, respectively. Since the main spindle 60 penetrates these slits 21 and 31, the main spindle 60 is movable in forward/backward/left/right directions on the pivoting frames 20 and 30.

The widths of the slits 21 and 31 need to be large enough to allow for the penetration of the main spindle 60. That is, the widths of the slits 21 and 31 need to be greater than the diameter of the main spindle 60.

The slide members 40 and 50 may each be an LM guide or an air bearing, for example. The slide members 40 and 50 move along rails 22 and 32 attached to the pivoting frames 20 and 30, respectively.

Meanwhile, in the above example, there are two pivoting frames 20 and 30. However, as shown in FIG. 5, there may be a single pivoting frame 20.

The main spindle 60 may be fixed to the left/right by using an LM guide or an air bearing as the slide member 40. Meanwhile, by using a linear motor as the slide member 40, the main spindle 60 may be rotated to the left/right.

That is, in the case where the linear motor is used as the slide member 40, driving sources may be provided inside the slide members 40 and 50. In this case, the main spindle 60 can move without the aforementioned motors M1 and M2.

Figure 5:
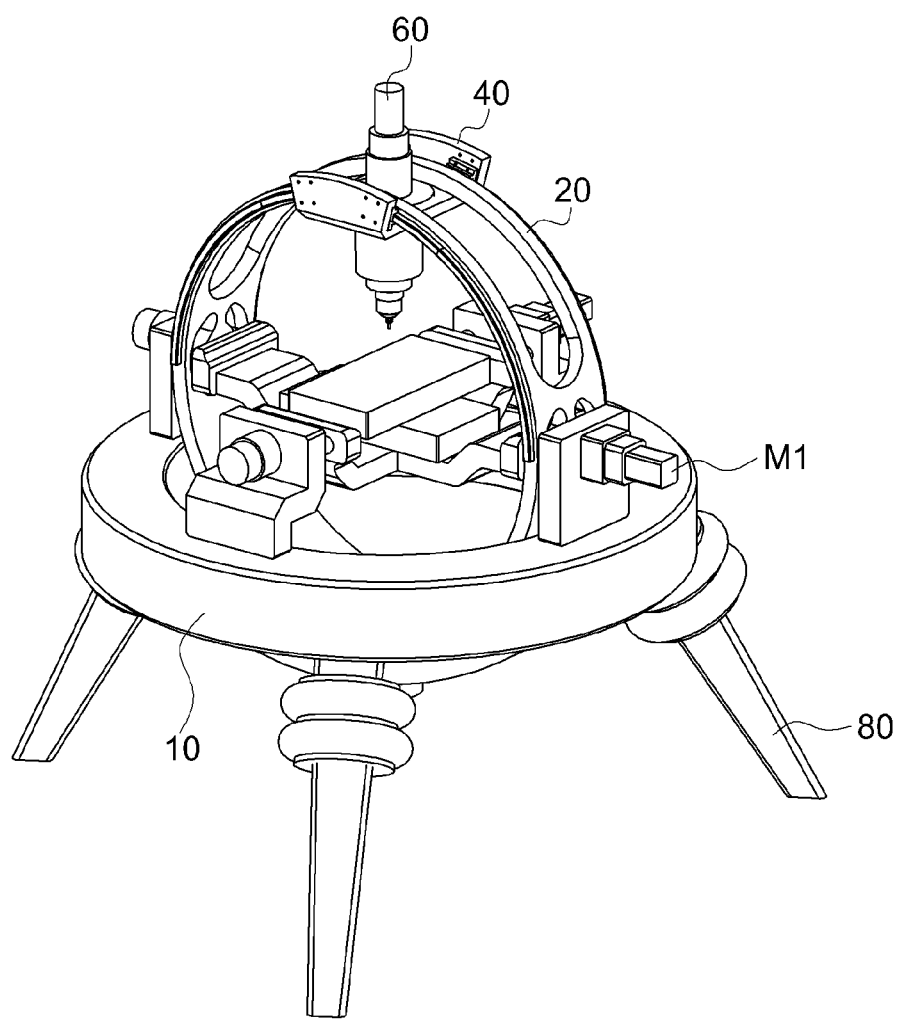
FIG. 5 is a perspective view of a 3D reconfigurable machining system according to another exemplary embodiment of the present invention.

Referring to FIG. 5, the forward/backward pivoting frame 20 is driven by the motor M1, and the forward/backward rotation of the main spindle 60 may be controlled by the forward/backward pivoting frame 20. Meanwhile, by using the linear motor as the slide member 40, the location of the main spindle 60 in terms of left/right direction is controlled by the left/right rotation of the slide member 40.

Figure 7:
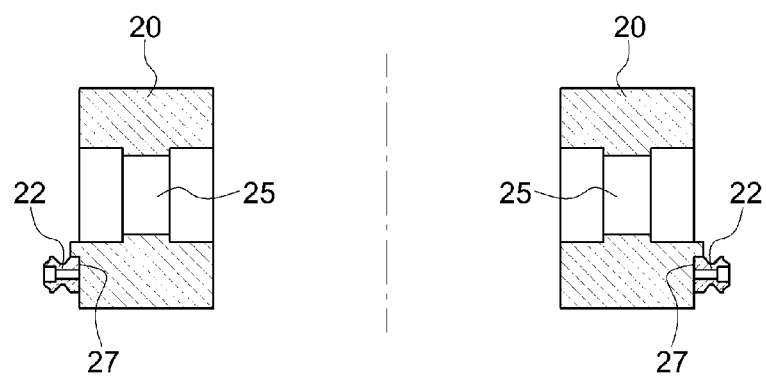
FIG. 7 is a cross-sectional view illustrating the cross-section taken along line A-A of FIG. 6.

Referring to FIG. 7, the forward/backward pivoting frame 20 and the left/right pivoting frame 30 may each have a sectional surface with an I-beam shape. In this case, a hole 25 may be formed to horizontally penetrate the concave portion of the I-beam shape.

The I-beam shaped sectional surface of the pivoting frames 20 and 30 may contribute to increasing rigidity. Furthermore, the holes 25 formed in the pivoting frames 20 and 30 may make them lighter and highly resistible to thermal deformation.

Figure 6:
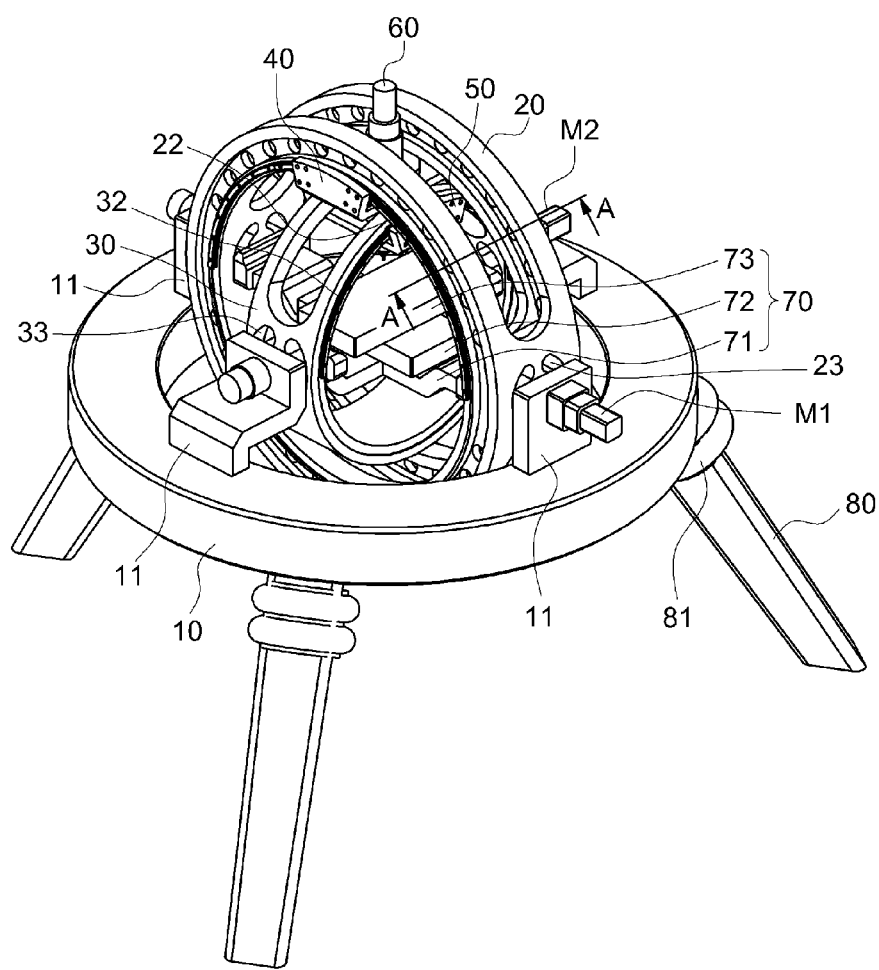
FIG. 6 is a perspective view of a 3D reconfigurable machining system employing a pivoting frame having an I-beam shaped sectional surface.

FIG. 6 illustrates a 3D reconfigurable machining system in which the sectional surface of the forward/backward pivoting frame 20 has an I-beam shape. FIG. 7 is a sectional-view taken along line A-A of FIG. 6.

A rail 22 is coupled to a groove 27 formed in the forward/backward pivoting frame 20.

By the above construction, the forward/backward pivoting frame 20 has the I-beam shaped sectional surface, and the rail 22 can be stably coupled to the forward/backward pivoting frame 20.

Furthermore, a pair of banana-shaped holes 23 are formed at each end of the slit 21 in the forward/backward pivoting frame 20, and a pair of banana-shaped holes 33 are formed at each end of the slit 31 in the left/right pivoting frame 30. A worktable lower base 71 is fixed to the brackets 11 through the banana-shaped holes 23 and 33. The worktable lower base 71 has a rough '+' shape, and is fixed to four spots of the support frame 10.

Also, a worktable intermediate base 72 is slidably installed on the worktable lower base 71. A worktable 73 is placed on the worktable intermediate base 72, and the worktable 73 is slidable while roughly perpendicularly crossing the worktable intermediate base 72. A workpiece is fixed to the worktable 73.

Since the worktable lower base 71 is fixed through the banana-shaped holes 23 and 33, the rigidity of the forward/backward pivoting frame 20 and the left/right pivoting frame 30 is maintained while each of the pivoting frames 20 and 30 can freely rotate in forward/backward/left/right directions without being interrupted by a shaft (not shown) supporting the worktable lower base 71.

Furthermore, since the main spindle 60 is movable up and down by being coupled with a linear motor or the like, the degree of freedom in operation can be improved.

Meanwhile, a hemispherical chip discharge unit 90 is attached to the lower portion of the support frame 10. The chip discharge unit 90 is attached so as to close and seal the lower portion of the support frame 10, and has a hole in its center. Chips generated in a machining process are discharged after being gathered in the center of the chip discharge unit 90, thus facilitating the collection of the chips.

Hereinafter, the operation of the 3D reconfigurable machining system according to an exemplary embodiment of the present invention will be described in more detail with reference to accompanying drawings.

Figure 8:
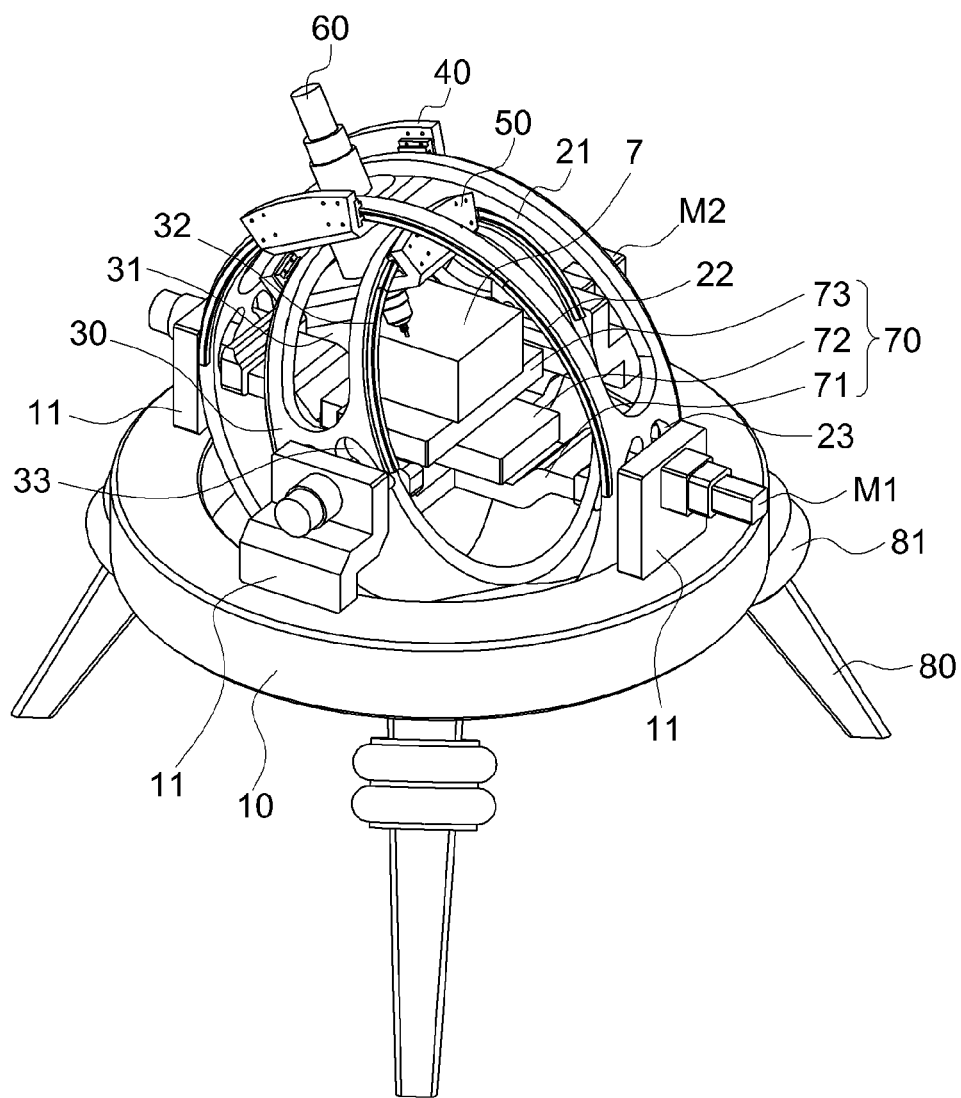
FIG. 8 is a perspective view illustrating how the 3D reconfigurable machining system according to the first embodiment operates.

FIG. 8 is a perspective view illustrating how the 3D reconfigurable machining system, according to an exemplary embodiment of the present invention, operates.

When the motor M2 connected to the left/right pivoting frame 30 is driven, the left/right pivoting frame 30 is rotated about a motor shaft (not shown) of the motor M2.

The forward/backward slide member 50 coupled to the left/right pivoting frame 30 is pivoted together with the left/right pivoting frame 30. The left/right slide member 40 coupled to the forward/backward pivoting frame 20 moves along the rail 22 attached to the forward/backward pivoting frame 20, thus moving the main spindle 60 to a location for machining a workpiece. In this state, the main spindle 60 is moved forwards/backwards so that the workpiece can be machined.

Meanwhile, as shown in FIG. 5, if there is one pivoting frame 20, the pivoting frame 20 is pivoted by the operation of the motor M1, and the slide member 40 is pivoted together with the pivoting frame 20. The slide member 40 is moved along the rail by the operation of the linear motor, thus moving the main spindle 60 to a location for machining the workpiece. In this state, the main spindle 60 is moved forwards/backwards, so that the workpiece can be machined.

Through the structure described above, the 3D reconfigurable machining system according to an exemplary embodiment of the present invention can three-dimensionally process a workpiece by reconfiguring the main spindle 60 in upper/lower/left/right/forward/backward directions by the use of the forward/backward pivoting frame 20 and the left/right pivoting frame 30 individually pivoting through the motor M1 and M2.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of Symbols | |
| --- | --- |
| 10: support frame | 11: bracket |
| 20: forward/backward pivoting frame | 21, 31: slit |
| 22, 32: rail | 23, 33: hole |
| 30: left/right pivoting frame | 40: left/right slide member |
| 50: forward/backward slide member | 60: main spindle |
| 71: worktable lower base | 72: worktable intermediate base |
| 73: worktable | 80: support |
| 81: air cushion | 90: chip discharge unit |
| 100: 3D reconfigurable machining system | M1, M2: motor |

What is claimed is:

1. A three-dimensional (3D) reconfiguration machining system, the system comprising:
   a support frame;
   a pivoting frame pivotably coupled to the support frame;
   a slide member slidably coupled to the pivoting frame; and
   a main spindle coupled to the slide member,
   wherein the pivoting frame has a circular shape;
   wherein the support frame is supported by a support comprising three supports, the supports being separated from each other by the same interval;
   wherein an air cushion is installed at the support;
   wherein at least two holes facing each other with respect to the center of the pivoting frame are formed in a circumferential portion of the pivoting frame, and
   a worktable lower base is coupled to the support frame through the two holes.

2. The system of claim 1, wherein the support frame is formed as a granite bed.

3. The system of claim 1, wherein the support frame has a doughnut or square shape.

4. The system of claim 1, wherein at least one bracket is installed at the support frame.

5. The system of claim 4, wherein the bracket comprises two brackets, the brackets facing each other with respect to the center of the support frame.

6. The system of claim 1, wherein the pivoting frame is pivoted by being connected to a motor.

7. The system of claim 1, wherein the holes each have an arch or banana shape.

8. The system of claim 1, further comprising:
   an intermediate base slidably coupled onto the worktable lower base; and
   a worktable placed on the intermediate base.

9. The system of claim 8, wherein the worktable slidably crosses the worktable intermediate base.

10. The system of claim 1, wherein the main spindle is moved by a linear motor.

11. The system of claim 1, wherein a chip discharge unit is attached to the support frame, and the chip discharge unit has a hole in the center thereof.

12. The system of claim 1, wherein the slide member is a linear motor.

13. The system of claim 1, wherein the slide member is an air bearing or an LM guide.

14. The system of claim 1, wherein the pivoting frame has a sectional surface with an I-beam shape.

15. The system of claim 14, wherein a plurality of holes are formed along a circumferential surface of the pivoting frame.

16. A three-dimensional (3D) reconfigurable machining system, the system comprising:
   a support frame;
   a forward/backward pivoting frame pivotably coupled to the support frame;
   a left/right pivoting frame crossing the forward/backward pivoting frame and pivotably coupled to the support frame;
   a left/right slide member slidably coupled to the forward/backward pivoting frame;
   a forward/backward slide member slidably coupled to the left/right pivoting frame; and
   a main spindle installed through the left/right slide member and the forward/backward slide member at a location where the forward/backward pivoting frame and the left/right pivoting frame cross each other,
   wherein the forward/backward pivoting frame and the left/right pivoting frame have a circular shape.

17. The system of claim 16, further comprising:
   a worktable lower base installed at the support frame to penetrate the forward/backward pivoting frame and the left/right pivoting frame;
   a worktable intermediate base slidably installed on the worktable lower base; and
   a worktable slidably installed on the worktable intermediate base while crossing the worktable intermediate base.

18. The system of claim 16, wherein the forward/backward pivoting frame and the left/right pivoting frame are pivoted by being connected to a motor.

19. The system of claim 16, wherein at least two holes facing each other with respect to the center of the forward/backward pivoting frame are formed in a circumferential portion of the forward/backward pivoting frame,
   at least two holes facing each other with respect to the center of the left/right pivoting frame are formed in a circumferential portion of the left/right pivoting frame, and
   the worktable lower base is coupled to the support frame through the at least two holes.

20. The system of claim 16, wherein each of the slide members is a linear motor.

21. The system of claim 16, wherein each of the slide members is an air bearing or an LM guide.

22. The system of claim 16, wherein each of the pivoting frames has a sectional surface with an I-beam shape.

23. The system of claim 22, wherein a plurality of holes are formed along a circumferential portion of the pivoting frames.

24. The system of claim 16, wherein the support frame has a doughnut or square shape.

* * * * *